United States Patent [19]

Carre et al.

[11] Patent Number: 4,624,507
[45] Date of Patent: Nov. 25, 1986

[54] SAFETY DEVICE ON A BRAKING CORRECTOR

[75] Inventors: Jean-Jacques Carre, Le Raincy; Jean-Marc Cheron, Longperrier, both of France

[73] Assignee: Societe Anonyme D.B.A., Paris, France

[21] Appl. No.: 713,227

[22] Filed: Mar. 18, 1985

[30] Foreign Application Priority Data

Mar. 28, 1984 [FR] France .................. 84 04842

[51] Int. Cl.⁴ .............................................. B60T 8/26
[52] U.S. Cl. .................. 303/6 C; 303/22 A; 303/56
[58] Field of Search .............. 303/6 C, 6 R, 22 A, 303/56

[56] References Cited

U.S. PATENT DOCUMENTS 3,317,252  5/1967  Gassman .................. 303/56 X
3,390,921  7/1968  Klimek ...................... 303/56
4,448,457  5/1984  Pressaco .................. 303/56 X Primary Examiner—Duane A. Reger
Attorney, Agent, or Firm—Larry J. Palguta; Ken C. Decker

[57] ABSTRACT

The invention concerns a braking corrector (10) of the type incorporating at least one piston (16, 16') provided with a passage joining the inlet chamber (18, 18') and the outlet chamber (22, 22') to one another, a valve (26, 26') controlling the communication through the passage, a control device (34) generating a pilot force which is capable of being applied to the piston (16, 16'), pushing the latter in the direction of opening of the valve (26, 26'); the invention provides the corrector (10) with a device (52) for monitoring the pilot force which is capable of limiting the latter when the reaction force generated by the pressure on the piston (16, 16') exceeds the pilot force by a predetermined amount.

10 Claims, 2 Drawing Figures

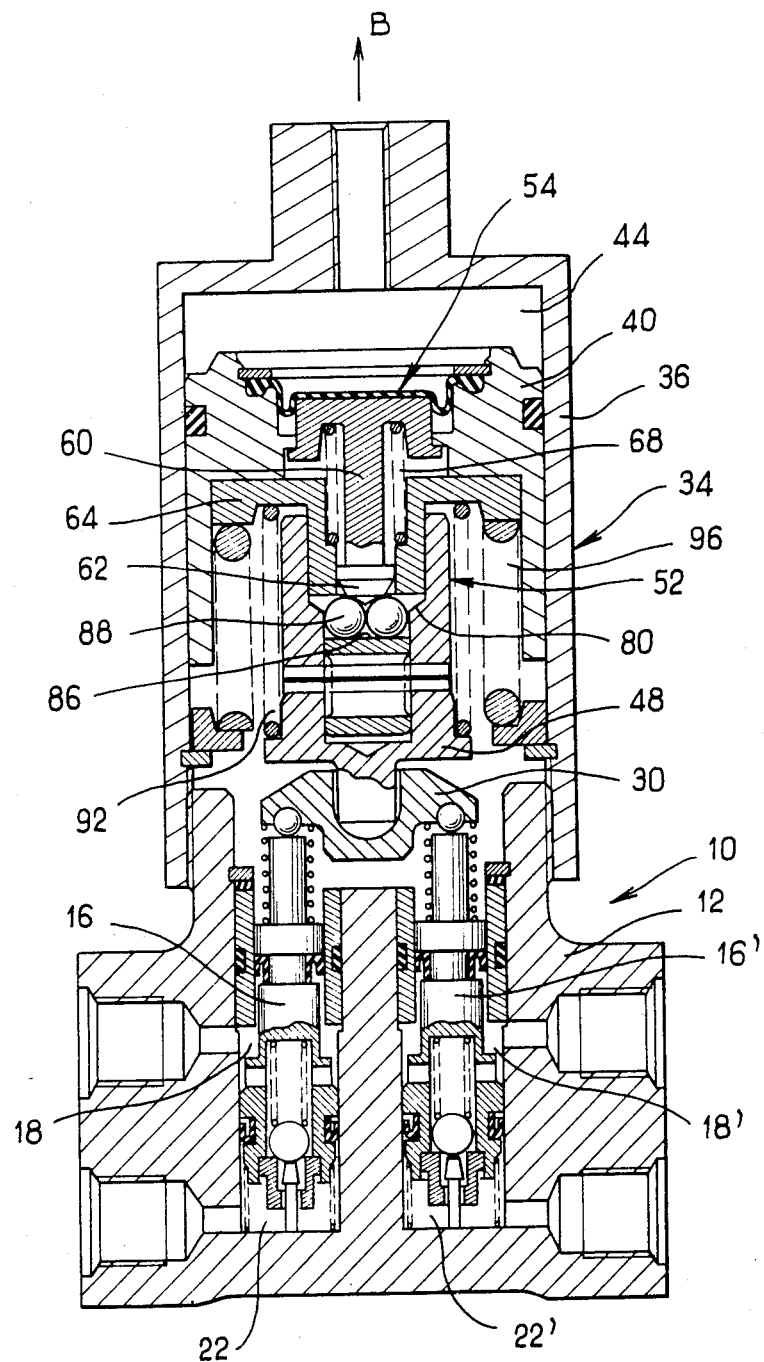
FIG._2

SAFETY DEVICE ON A BRAKING CORRECTOR

The subject of the invention is a braking corrector which is capable of being interposed between a source of hydraulic pressure and a motor vehicle braking circuit.

The invention particularly concerns a corrector of the type incorporating a casing provided with at least one bore, a simple or differential hydraulic piston sliding in the bore and defining in it first and second pressure chambers capable of being joined to the source of pressure and to the braking circuit, respectively, the piston controlling the flow of a fluid under pressure between the chambers, and a control device capable of generating a pilot force on the hydraulic piston so as to push the latter towards the inside of the body in the direction in which the flow of fluid is established, the fluid under pressure generating a reaction force pushing the piston towards the outside of the body in the direction in which the flow of fluid is interrupted.

Such a braking corrector is particularly described, and its function together with its method of operation are explained, in French Patent Application No. 77-07,361 filed Mar. 11, 1977 by the applicant company. In the document, the pilot force is generated by a control device formed by a lever applying a force onto the hydraulic piston as a function of the load of the vehicle, thus defining a so-called cut-off pressure determined by the characteristics of the corrector when the reaction force exceeds the pilot force, the cut-off pressure being the pressure for which the flow of fluid is interrupted between the two chambers.

When the control device incorporates a component which slides relative to the casing in order to apply the pilot force onto the hydraulic piston, seizure of the sliding component can occur, for example, as a result of a vehicle being at rest for a prolonged period, corresponding to a position of the said sliding component holding the hydraulic piston in a position such that communication between the two chambers is maintained. In this case, when the brakes are applied, the reaction force generated on the hydraulic piston will not be sufficient to push back the sliding component and consequently the flow of fluid cannot be interrupted at the desired moment. Seizure of the sliding component can occur, for example, owing to the fact that a seal made of rubber is postioned between the casing and the sliding component which could cause "sticking" of the two components, as is well known to a person versed in the art.

This problem is even greater in the case in which the sliding component is a cylinder subjected to a pressure which varies as a function of the load of the vehicle. In fact, in addition to the problem of "sticking" the variable pressure may be supplied from the air providing the suspension of the vehicle, air which may be either polluted, which would allow the sliding zones to become dirty, or which may carry water, which would allow either corrosion or seizure of the sliding component in the case of freezing.

Such a seizure of the sliding component, as a result of which the corrector is incapable of interrupting the flow of fluid, can cause loss of control of the vehicle by premature locking of the wheels, and this can occur all the more easily in the case in which the vehicle is lightly loaded.

The aim of the present invention is to correct this fault, and for this purpose it proposes that in a braking corrector of the type described above, a device be provided for monitoring the pilot force which is capable of limiting the latter when the reaction force exceeds the pilot force by a predetermined amount.

In a preferred embodiment of the invention, the monitoring device, positioned between the sliding plunger and the hydraulic piston, provides a mechanical link between these two components under normal conditions of operation but is capable of interrupting this mechanical link, and thus of allowing the flow of fluid to be interrupted when the reaction force exceeds the pilot force by a predetermined amount.

Safe operation of the device is thus obtained, ensuring the interruption of the flow of fluid even when the sliding component is momentarily or permanently seized and thus any premature locking of the rear wheels is avoided.

The characteristics and advantages of the invention will emerge more clearly from the following description of a preferred embodiment applied to the case of a braking compensator for twin braking circuits incorporating a control device linked to the load of the vehicle through a pneumatic suspension pressure, given by way of illustrative example with reference to the accompanying drawings, in which:

FIG. 2 is a view similar to that shown in FIG. 1, in which, after seizure of the sliding components, the monitoring device has been put into operation.

Figure 1:
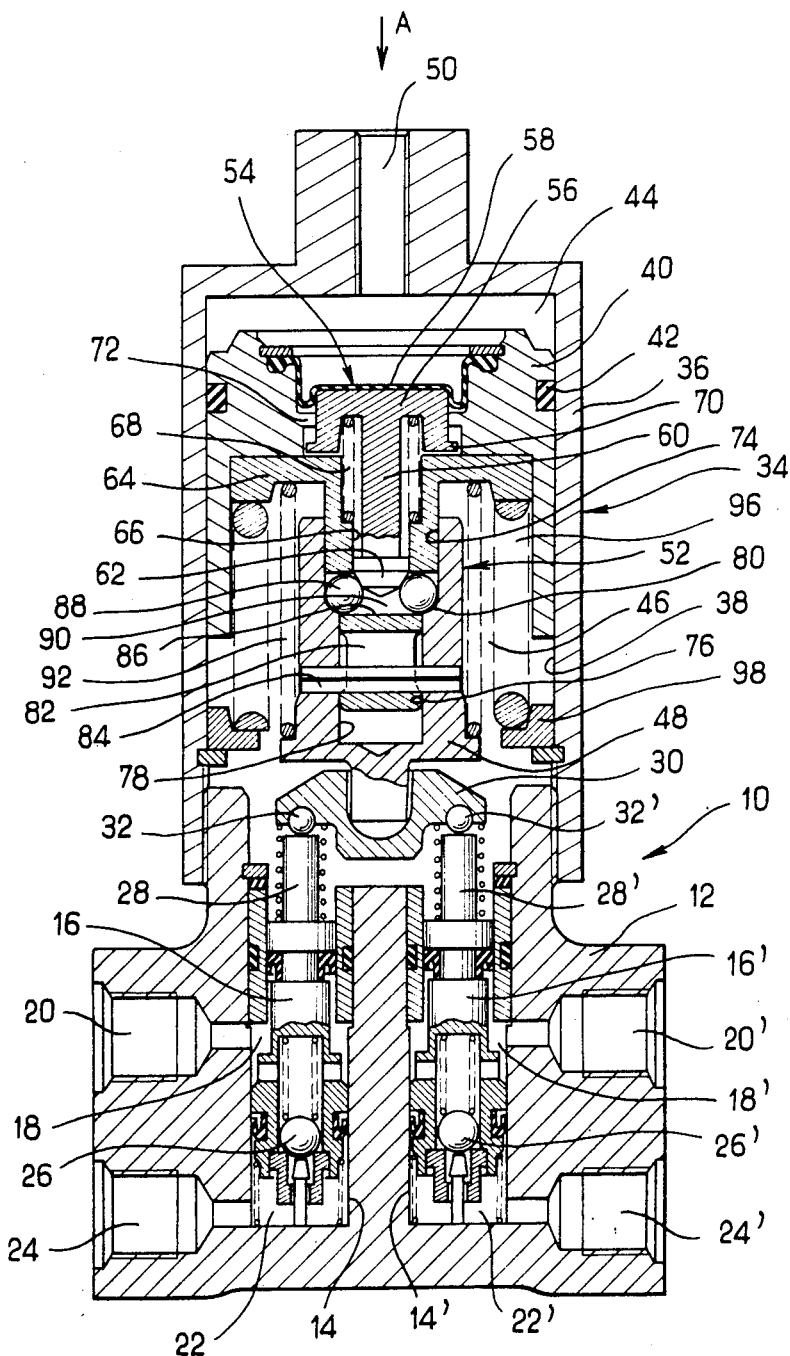
FIG. 1 is a section of a braking compensator equipped with the device according to the invention, and shown in the position of actuation of the brakes.

The braking corrector, designated as an assembly by the reference 10, incorporates a casing 12 in which are formed two parallel bores 14 and 14'. These two bores 14 and 14' each have a stepped piston 16 and 16', respectively, which is capable of sliding so as to be sealed relative to the casing 12. Each of these pistons 16 and 16' defines in the corresponding bore a first chamber 18 and 18' which is capable of being joined to a source of fluid pressure (not shown) through supply ports 20 and 20', respectively. Each of the pistons 16 and 16' delimits a second chamber 22 and 22' defined between the bottom of the bore and the correspoding piston, capable of being joined to a braking circuit (not shown), for example the rear wheels of the vehicle, through outlet ports 24 and 24'. In a conventional manner, the pistons 16 and 16' each incorporate a valve designated as an assembly by the reference 26 and 26', capable of putting the chambers 18 and 22 or 18' and 22' into communication according to the position occupied by the pistons 16 and 16' relative to the casing 12. FIG. 1 shows the pistons 16 and 16' in a position in which the valves are closed. The hydraulic pistons 16 and 16' are provided with ends 28 and 28' which project out of the bores 14 and 14' and against which a bar 30 comes to bear through components having spherical surfaces 32 and 32'.

In the embodiments shown, the hydraulic pistons 16 and 16' are stepped in such a way that the braking corrector 10 operates as a compensator, that is to say after closure of the valves any rise in pressure in the first chambers 18 and 18' results in a smaller rise in pressure in the chambers 22 and 22' in a manner which is well known to a person versed in the art.

In the embodiment shown, the bar 30 is capable of being actuated by a control device designated as an assembly by the reference 34. This control device 34 incorporates a body 36 in which a bore 38 is formed terminating at one end in a threaded portion which screws onto the casing 12 of the corrector. The body 38 houses a piston 40 which is able to slide and which incorporates a seal 42 defining in the body 34 two chambers which are sealed from one another 44 and 46. The piston 40, forming the pilot push rod of the control device, is capable of cooperating with the bar 30 through a push rod 48. The piston 40 and the push rod 48 thus form a pilot cylinder which is capable of being subjected to a pressure existing in the chamber 44 which is joined to a source of pressure by means of the port 50. The chamber 46 is connected to the atmosphere.

In accordance with the invention, the control device 34 incorporates a monitoring device designated as an assembly by the reference 52. This monitoring device 52, incorporates a monitoring cylinder 54 mounted concentrically with the piston 40 and inside the latter, and formed by a monitoring piston 56 and a sealing membrane 58 fixed partly in the piston 40 and bearing at its central portion against the monitoring piston 56 thus providing the seal between the chambers 44 and 46 already defined by the piston 40. The monitoring piston 56 extends into a plunger 60 whose free end, facing towards the bar 30, terminates in a conical portion 62. The pilot piston 40 carries an intermediate component 64 which is firmly fixed to the piston 40 and which incorporates a stepped bore 66 providing guidance for the plunger 60 in the region of its conical end 62, and housing a spring 68 positioned between a shoulder formed by the stepped bore and the monitoring piston in such a way as to push the latter away from the bar 30. The monitoring piston 56 incorporates a collar 70 which limits the axial movements of the monitoring piston 56 between, firstly, the intermediate component 64, and secondly, a shoulder 72 formed in the piston 40. The intermediate component 64 is extended in the direction of the bar 30 and forms two concentric cylindrical surfaces 74 and 76 of different diameters, these two surfaces 74 and 76 being mounted so as to slide in a stepped bore 78 formed inside the push rod 48. A portion in the shape of a frustum of a cone 80 is formed in the region of the junction of the two diameters of the stepped bore 78. In the portion of smaller diameter of the extension of the intermediate component 64 a rectangular opening 82 is formed through which an elastic pin 84 passes, which is firmly fixed to the push rod 48. In addition, in the region of the change in diameter of the extension of the intermediate component 64, an opening 86 is formed in the form of a cylindrical hole, in which two balls 88 forming locking components are mounted so as to be free. The two balls define between them a space 90 into which the conical end 62 of the plunger 60 enters. The balls 88 are thus held between the portion in the shape of a frustum of a cone 80 of the push rod 48 and the conical end 62 of the plunger 60. An elastic component 92 formed by a spring holds the push rod 48 away from the intermediate component 64 within the limits allowed by the opening 82 and the elastic pin 84. Lastly, the pilot cylinder assembly is pushed away from the bar 30 by means of a spring 96 positioned between the intermediate component 64 and a bearing component 98 which is firmly fixed to the body 36 of the control device 34.

The corrector which is described above with reference to FIG. 1 operates in the following manner:

In the position shown, the braking corrector is in the position in which the flow of fluid, firstly, between the chambers 18 and 22, and secondly between the chambers 18' and 22', is interrupted, that is to say that the pilot force generated by the pilot piston 40-48 is just balanced by the hydraulic reaction forces developed by the pistons 16 and 16' against the pilot force. The direction of the pilot force is in the direction of the arrow A shown in FIG. 1 and the reaction forces are in the opposite direction.

In normal operation, the pressure existing in the chamber 44 is also applied to the monitoring cylinder 54. This force is transmitted to the plunger 60 and thus to its end 62, which pushes apart the two balls 88 bearing against the portion in the shape of a frustum of a cone 80 of the push rod 48. In these conditions, the push rod 48 is firmly fixed to the piston 40 through the balls 88 and the intermediate component 64 thus providing a mechanical link between the control device and the hydraulic pistons 16 and 16' through the bar 30.

In a conventional manner, if braking is released, that is to say when the hydraulic pressure in the chambers 18 and 18' drops, initially the hydraulic fluid will push back the balls 26 and 26' allowing fluid to pass from the chamber 22 to the chamber 18. Subsequently, the pilot force being greater than the reaction force, the bar 30 will push back the two pistons 16 and 16' towards the bottom of the bores 14 and 14' and the valves will be opened in a conventional manner by means of the push rods associated with the body 12.

When braking is applied once again, the valves being in their open position, the fluid will flow from the chamber 18/(18') to the chamber 22/(22') until the hydraulic reation force applied to the pistons 16 and 16' balances the pilot force generated by the pilot cylinder 40-48. The hydraulic pistons and the control piston 40 will move in a direction opposite to that of the arrow A so as to reach the position shown in FIG. 1.

In the part of the operation described above, it was shown that the pilot piston 40 moved in the direction of the arrow A when braking was released. If for any reason, for example sticking due to corrosion between the piston 40 and the body 36, the piston is seized in this position which corresponds to the free flow of fluid between the chambers 18 and 22, or 18' and 22', any rise in pressure in the chambers 18, 22, 18' and 22' generates reaction forces in a direction which is opposite to that of the arrow A. At a certain moment the reaction forces reach the value for which the flow of fluid should be interrupted. But as it is impossible to push back pilot cylinder owing to its seizure, the hydraulic pistons 16 and 16' remain in position and the pressure rises in the chambers 22 and 22' whereas the flow of fluid should have been interrupted. This rise in pressure in the chambers 22 and 22' corresponds to a rise in the rear brakes of the vehicle, and consequently can cause locking of the latter with the risks which this entails.

FIG. 2 shows the braking corrector 10 in which the piston 40 has seized relative to the body 36 of the control device 34 in a position in which the pilot cylinder normally holds the hydraulic pistons in a position such that the valves are normally permanently open.

In this FIG. 2, the monitoring device has been put into operation, in fact the reaction forces generated in the direction of the arrow B shown in FIG. 2 through the bar 30 have applied a reaction force on the push rod 48 which is greater than the pilot force which should normally have been generated by the pilot piston 40. In these conditions, the monitoring device 52 sees, firstly, the reaction force acting in the direction of the arrow B, and secondly, the monitoring cylinder develops a force in the direction opposite to that of the arrow B which corresponds to the pressure existing in the chamber 44. The piston 40 being seized, the reaction force increases without being able to move the pistons 16 and 16' until the portion in the shape of a frustum of a cone 80 carried by the push rod 48 develops a force in a direction such that the two balls 88 approach one another, until these balls 88 push back the conical ends 62 of the plunger 60 in the direction of the arrow B the force developed by the monitoring cylinder 54. When the balls 88 are sufficiently close to one another, the plunger 60 occupies a non-operative position as shown in FIG. 2, and the two balls 88, still guided by the opening 86, approach one another sufficiently to allow relative sliding between the push rod 48 and the intermediate component 64, thus permitting the beam 30 and the pistons 16 and 16' to move in the direction of the arrow B and to cause the closure of the valves carried by the two pistons 16 and 16'. In this way the mechanical link between the control device and the hydraulic piston is eliminated.

If in these conditions the braking pressure is released, that is to say that the pressures in the chambers 18 and 18' fall, initially the valves carried by the pistons 16 and 16' will open owing to a differential pressure so as to ensure a pressure drop in the chambers 22 and 22', and subsequently, the spring 92, by pushing back the push rod 48 in the direction opposite to that of the arrow B, will ensure the permanent opening of the piston valves, yet will also return the push rod 48 relative to the intermediate component 64 to a relative position as shown in FIG. 1, and the force exerted by the monitoring cylinder 54 on the plunger 60 will return the latter and the balls 88 to the initial position as shown in FIG. 1.

This return to the initial position of the monitoring device is particularly important in the case in which the piston 40 is seized by frozen water; the latter being capable of melting, the corrector can once again operate normally.

It is clear that for the monitoring device to be effective, the effective cross-section of the monitoring cylinder 54, the force of the spring 68 and the slopes of the conical portions 62 and 80 of the plunger 60 and of the push rod 48, respectively, are defined in such a way that the monitoring device is brought into operation for a pre-determined difference between the pilot force and the reaction force of between 5 and 15% of the value of the pilot force.

This braking corrector is particularly suited to being associated with a pneumatic vehicle suspension, and in this case, the chamber 44 is joined directly to the suspension pressure of the vehicle, and consequently, this pressure varies as a function of the load of the vehicle and thus the cut-off pressures of the corrector will also depend on the load of the vehicle.

It will easily be understood that the spring 96 may be compressed to a greater or lesser degree by screwing the body 36 on the casing 12, thus allowing a correct pre-adjustment of the corrector to be obtained.

It is understood that the invention is not limited to the embodiments shown, in particular the corrector may be a corrector with a simple hydraulic piston of the pressure limiter type and clearly it may incorporate only a single hydraulic piston. In the same way, the chamber 44 may be supplied with a constant pneumatic pressure or a hydraulic pressure which may or may not be variable. In the same way the construction of the control device may be subject to modifications without departing from the framework of the present invention.

We claim:

1. A braking corrector capable of being interposed between a source of hydraulic pressure and a motor vehicle braking circuit, of the type incorporating a casing provided with at least one bore, a differential hydraulic piston sliding in the bore and defining a first pusher chamber and a second pusher chamber capable of being joined to the source of hydraulic pressure and to the braking circuit, respectively, the piston controlling flow of fluid under pressure between the chambers, a control device capable of generating a pilot force on the hydraulic piston so as to push the hydraulic piston in a direction in which the flow of fluid is established, the fluid under pressure generating a reaction force pushing the piston in a direction in which the flow of fluid is interrupted, characterized in that the control device includes a monitoring device for monitoring the pilot force and which is capable of limiting the pilot force when the reaction force exceeds the pilot force by a predetermined amount, the monitoring device interposed between a pilot push rod of the control device and the hydraulic piston, the monitoring device including a plunger held in an operative position when the pilot force exceeds the reaction force increased by a predetermined value and ensuring a mechanical link between the control device and the hydraulic piston, the plunger being capable of occupying a non-operative position when the reaction force exceeds the pilot force increased by the predetermined amount to eliminate the mechanical link between the control device and the hydraulic piston, the plunger further including a conical end separating, in the operative position, two locking components which, by cooperating with a second push rod associated with the hydraulic piston, transmit the pilot force to the hydraulic piston, the two locking components being capable of causing the plunger to occupy the non-operative position when the force on the plunger generated by the reaction force exceeds the pilot force increased by the predetermined amount.

2. The braking corrector according to claim 1, characterized in that control device includes a pilot cylinder forming the pilot push rod and the monitoring device including a monitoring cylinder subjected to pressure.

3. The braking corrector according to claim 2, characterized in that the monitoring cylinder cooperates with the plunger to hold the plunger in the operative position as long as the reaction force does not exceed the pilot force increased by the predetermined amount.

4. The braking corrector according to claim 3, characterized in that the second push rod incorporates a portion in the shape of a frustum of a cone against which the locking components are pushed by means of the conical end of the plunger to provide a coupling together of the second push rod and the pilot push rod, the locking components being capable of leaving the portion in the shape of a frustum of a cone by pushing the conical end of the plunger so that the second push rod is no longer coupled to the pilot push rod when the force of the portion in the shape of a frustum of a cone on the locking components generated by the reaction force exceeds the force generated on the locking components by the conical end of the plunger.

5. The braking corrector according to claim 4, characterized in that the locking components are formed by balls guided in an opening formed in the pilot cylinder which cooperate with the portion in the shape of a frustum of a cone on each side of the opening and with the conical end of the plunger in a space separating the two balls.

6. The braking corrector according to claim 5, characterized in that the second push rod is mounted in a telescopic manner on the pilot push rod to enable the coupling to be eliminated between the second push rod and the pilot push rod.

7. The braking corrector according to claim 6, characterized in that the corrector is for a twin braking circuit incorporating two parallel hydraulic pistons mounted in two bores of the casing, the second push rod being formed by a beam ensuring the distribution of forces between the two hydraulic pistons and receiving from the hydraulic pistons corresponding reaction forces.

8. The braking corrector according to claim 6, characterized in that the plunger returns to the operative position when the reaction force becomes less than the pilot force by means of an elastic component which separates the pilot push rod from the second push rod.

9. The braking corrector according to claim 6, characterized in that the monitoring cylinder is positioned concentrically inside the pilot cylinder.

10. The braking corrector according to claim 1, characterized in that pressure on the pilot cylinder varies as a function of loading of the vehicle.

* * * * *